(12) United States Patent
Kakadia et al.

(10) Patent No.: US 9,713,167 B2
(45) Date of Patent: Jul. 18, 2017

(54) MULTISTAGE HIERARCHICAL PACKET SCHEDULING

(75) Inventors: Deepak Kakadia, Union City, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1159 days.

(21) Appl. No.: 13/495,734

(22) Filed: Jun. 13, 2012

(65) Prior Publication Data

US 2013/0336229 A1 Dec. 19, 2013

(51) Int. Cl.
*H04W 72/12* (2009.01)
*H04W 72/04* (2009.01)

(52) U.S. Cl.
CPC .... *H04W 72/1257* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 6,850,764 B1* | 2/2005 | Patel | ............... | H04W 72/0453 370/328 |
| 7,027,457 B1* | 4/2006 | Chiussi | ............... | H04L 47/11 370/414 |
| 7,668,177 B1* | 2/2010 | Trapp | ............... | H04L 12/5693 370/412 |
| 2002/0075799 A1* | 6/2002 | Bennett | ............... | H04L 47/10 370/229 |
| 2003/0152096 A1* | 8/2003 | Chapman | ............... | H04L 12/5695 370/412 |
| 2005/0078655 A1* | 4/2005 | Tiller | ............... | H04L 12/5693 370/351 |
| 2005/0141427 A1* | 6/2005 | Bartky | ............... | H04L 47/10 370/235 |
| 2005/0243853 A1* | 11/2005 | Bitar | ............... | H04L 12/5693 370/432 |
| 2008/0201561 A1* | 8/2008 | Bates et al. | ............... | 712/228 |
| 2009/0116438 A1* | 5/2009 | Madan et al. | ............... | 370/329 |
| 2009/0252035 A1* | 10/2009 | Fukunaga et al. | ......... | 370/230.1 |
| 2011/0149735 A1* | 6/2011 | Mangano | ............. | G06F 13/368 370/235 |
| 2012/0092991 A1* | 4/2012 | Jeong et al. | ............... | 370/235 |
| 2013/0028080 A1* | 1/2013 | Rao et al. | ............... | 370/230 |

* cited by examiner

*Primary Examiner* — Chirag Shah
*Assistant Examiner* — Joshua Smith

(57) ABSTRACT

A system may receive a bandwidth allocation policy, may allocate first bandwidth to a first set of queues based on the bandwidth allocation policy, and may allocate second bandwidth to a second set of queues based on the bandwidth allocation policy. The system may identify a first characteristic associated with packets, and may store information associated with the packets in first queues based on the first characteristic. The system may identify a second characteristic associated with the packets, and may store information associated with the packets, from the first queues, in second queues, based on the second characteristic, the allocated first bandwidth, and the bandwidth allocation policy. The system may store information associated with the packets, from the second queues, in an output queue based on the allocated second bandwidth and the bandwidth allocation policy, and may service the packets from the output queue for delivery to a device.

20 Claims, 7 Drawing Sheets

MULTISTAGE HIERARCHICAL PACKET SCHEDULING

BACKGROUND

Communication network end users often consume different amounts of network resources. As a result, different end users may experience different communication service qualities. For example, an end user running bandwidth-intensive applications on a mobile device may hog network bandwidth, which may result in less bandwidth and poorer service quality for other end users.

DETAILED DESCRIPTION OF PREFERRED EMBODIMENTS

The following detailed description of example embodiments refers to the accompanying drawings. The same reference numbers in different drawings may identify the same or similar elements.

The term "packet," as used herein, may refer to a packet, a datagram, a cell, a fragment of a packet, a fragment of a datagram, a fragment of a call, or any other type or arrangement of data that may be carried at a specified communication layer.

Communication networks often operate by dividing communication transmissions into packets and delivering the packets to a device, where the packets may be properly sequenced in order to receive the original transmission. Network bandwidth restrictions may limit the quantity of packets that can be transmitted simultaneously. To deal with bandwidth restrictions, network devices may queue a packet for transmission based on a priority associated with the packet.

A packet may be prioritized and queued based on a traffic class, such as a quality of service class identifier ("QCI"), associated with the packet. QCI classes may be used to identify characteristics of a packet, such as a type of communication associated with the packet (e.g., conversational voice, conversational video, real-time gaming, streaming video, Internet protocol multimedia subsystem signaling, streaming video, web, e-mail, etc.), a priority of the packet (e.g., a relative priority compared to other packets associated with different QCI classes), whether the packet is associated with a guaranteed bit rate service or a non-guaranteed bit rate service, a permissible transmission delay associated with the packet, and/or a permissible packet error loss rate associated with the packet.

Prioritizing and queuing packets based solely on QCI classes may be unfair to end users because QCI class queues may be shared across a large number of end user devices. As a result, end user devices running bandwidth-intensive applications may hog bandwidth allocated to a particular QCI class queue, which may result in less bandwidth and poorer service quality for other end users.

Implementations described herein are able to more fairly allocate network bandwidth to end user devices. This may be achieved by creating a hierarchy of packet queues associated with user devices, traffic classes, and/or applications running on user devices. Network bandwidth may be allocated among the hierarchical queues in order to ensure fair, effective, and efficient delivery of packets to end user devices, which may aid in achieving quality of service ("QoS") guarantees.

Figure 1:
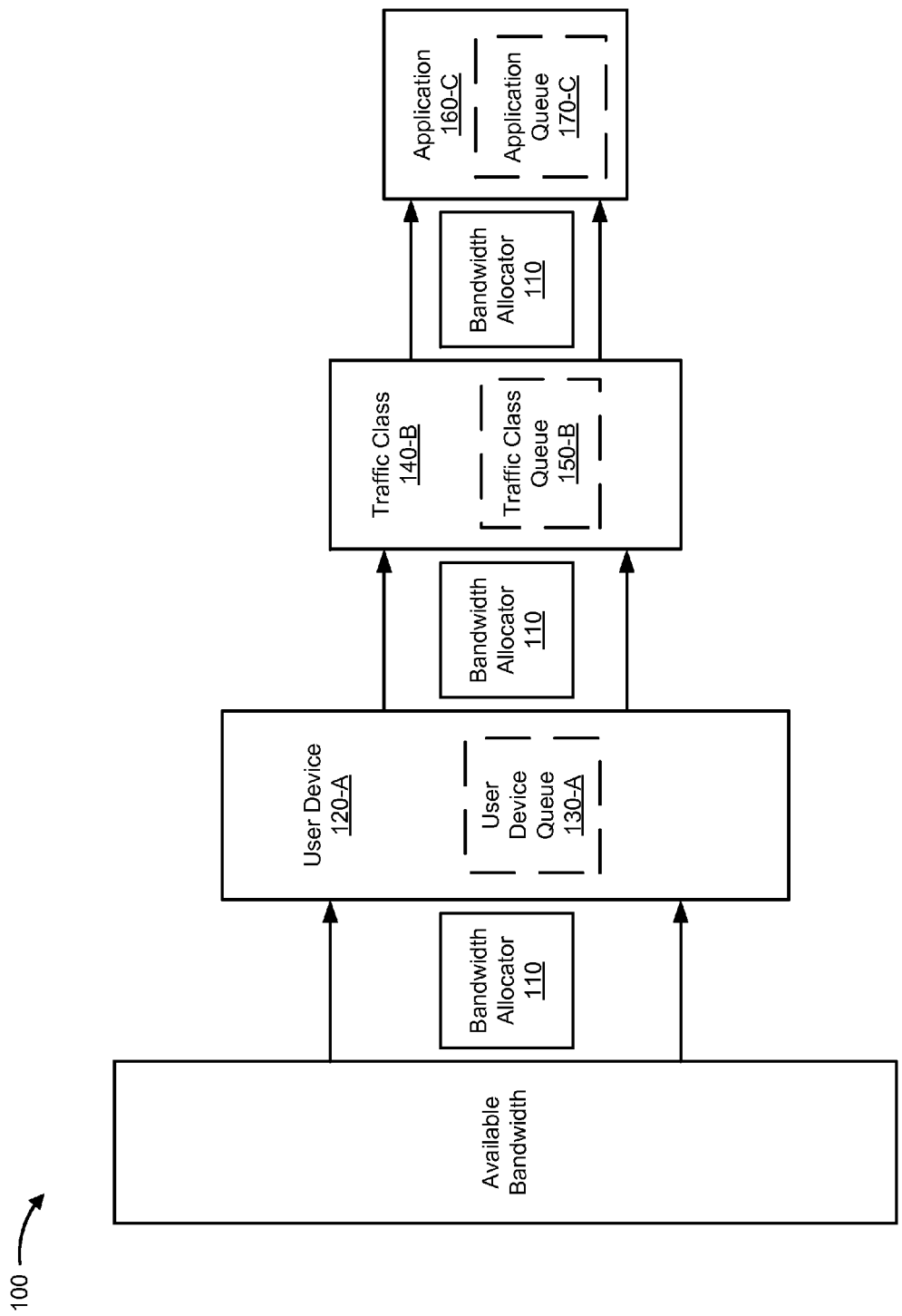
FIG. 1 is a diagram of an overview of an implementation described herein.

FIG. 1 is a diagram of an overview 100 of an implementation described herein. As illustrated in FIG. 1, bandwidth allocator 110 may allocate available bandwidth to A user devices 120 (A≥1), each having a user device queue 130. The bandwidth allocated to a user device 120 may be further allocated by bandwidth allocator 110 to B traffic classes 140 (B≥1) associated with communications to and/or from that user device 120. Each traffic class 140 may have a traffic class queue 150. The bandwidth allocated to a traffic class 140 may be further allocated by bandwidth allocator 110 to C applications 160 (C≥1) running on user device 120. Each application 160 may have an application queue 170. A packet to be transmitted over a network may be prioritized, queued, and/or serviced based on a user device, a traffic class, and/or an application associated with the packet.

Figure 2:
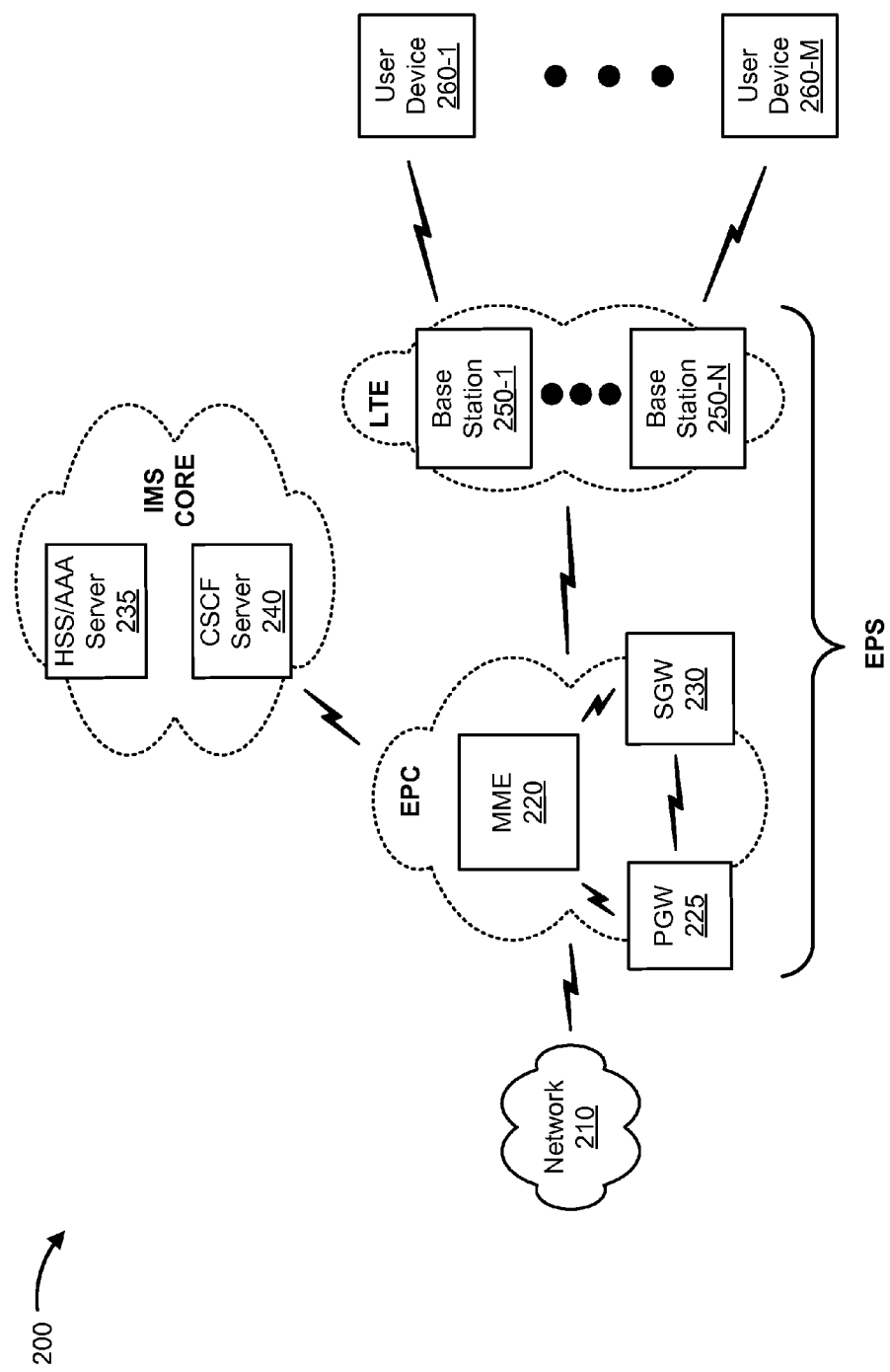
FIG. 2 is a diagram of an example environment in which systems and/or methods described herein may be implemented.

FIG. 2 is a diagram of an example environment 200 in which systems and/or methods described herein may be implemented. Environment 200 may include a network 210, a mobility management entity device 220 (hereinafter referred to as "MME 220"), a packet data network ("PDN") gateway 225 (hereinafter referred to as "PGW 225"), a serving gateway 230 (hereinafter referred to as "SGW 230"), a home subscriber server ("HSS")/authentication, authorization, accounting ("AAA") server 235 (hereinafter referred to as "HSS/AAA server 235"), a call session control function ("CSCF") server 240 (hereinafter referred to as "CSCF server 240"), a set of base stations 250-1 through 250-N (N≥1) (hereinafter referred to collectively as "base stations 250," and individually as "base station 250"), and a set of user device 260-1 through 260-M (M≥1) (hereinafter referred to collectively as "user devices 260," and individually as "user device 260").

The number of devices and/or networks illustrated in FIG. 2 is provided for explanatory purposes. In practice, there may be additional devices and/or networks, fewer devices and/or networks, different devices and/or networks, or differently arranged devices and/or networks than are shown in FIG. 2. Furthermore, two or more of the devices illustrated in FIG. 2 may be implemented within a single device, or a single device illustrated in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

An implementation is described as being performed within a long term evolution ("LTE") network for explanatory purposes. Some implementations may be performed within a network that is not an LTE network.

Environment 200 may include an evolved packet system ("EPS") that includes an LTE network and/or an evolved packet core ("EPC") that operate based on a third generation partnership project ("3GPP") wireless communication standard. The LTE network may be a radio access network ("RAN") that includes one or more base stations 250 that take the form of evolved Node Bs ("eNBs") via which user device 260 communicates with the EPC. The EPC may include MME 220, PGW 225, and/or SGW 230 that enable user device 260 to communicate with network 210 and/or an Internet protocol ("IP") multimedia subsystem ("IMS") core. The IMS core may include HSS/AAA server 235 and/or CSCF server 240, and may manage authentication, session initiation, account information, profile information, etc., associated with user device 260.

Network 210 may include one or more wired and/or wireless networks. For example, network 210 may include a cellular network, a public land mobile network ("PLMN"), a second generation (2G) network, a third generation (3G) network, a fourth generation (4G) network, a fifth generation ("5G") network, and/or another network. Additionally, or alternatively, network 210 may include a local area network ("LAN"), a wide area network ("WAN"), a metropolitan area network ("MAN"), a telephone network (e.g., the Public Switched Telephone Network ("PSTN")), an ad hoc network, an intranet, a fiber optic-based network (e.g., "FiOS"), and/or a combination of these or other types of networks.

MME 220 may include one or more computation and/or communication devices that gather, process, search, store, and/or provide information in a manner described herein. For example, MME 220 may perform operations relating to authentication of user device 260. In some implementations, MME 220 may facilitate the selection of a PGW 225 and/or an SGW 230 to serve traffic to and/or from user device 260. MME 220 may perform operations associated with handing off user device 260 from a first base station 250 to a second base station 250 when user device 260 is exiting a cell associated with the first base station 250. MME 220 may also perform an operation to hand off user device 260 from a second base station 250 to a first base station 250 when user device 260 is entering the cell associated with first base station 250. Additionally, or alternatively, MME 220 may select another MME (not pictured), to which user device 260 should be handed off (e.g., when user device 260 moves out of range of MME 220).

PGW 225 may include one or more computation and/or communication devices that gather, process, search, store, and/or provide information in a manner described herein. PGW 225 may include one or more data processing and/or traffic transfer devices, such as a gateway, a router, a modem, a switch, a firewall, a network interface card (NIC), a hub, a bridge, a proxy server, an optical add/drop multiplexer ("OADM"), or any other type of device that processes and/or transfers traffic. In one example implementation, PGW 225 may aggregate traffic received from one or more SGWs 230, and may send the aggregated traffic to network 210. In another example implementation, PGW 225 may receive traffic from network 210 and may send the traffic to user device 260 via SGW 230.

SGW 230 may include one or more computation and/or communication devices that gather, process, search, store, and/or provide information in a manner described herein. SGW 230 may include one or more data processing and/or traffic transfer devices, such as a gateway, a router, a modem, a switch, a firewall, a NIC, a hub, a bridge, a proxy server, an OADM, or any other type of device that processes and/or transfers traffic. In one example implementation, SGW 230 may aggregate traffic received from one or more base stations 250 associated with the LTE network, and may send the aggregated traffic to network 210 (e.g., via PGW 225) and/or other network devices associated with the IMS core and/or the EPC. SGW 230 may also receive traffic from other network devices and/or may send received traffic to user device 260 via base station 250. SGW 230 may perform operations associated with handing off user device 260 from and/or to the LTE network.

HSS/AAA server 235 may include one or more server devices, or other types of computation and/or communication devices, that gather, process, search, store, and/or provide information in a manner described herein. For example, HSS/AAA server 235 may manage, update, and/or store, in a memory associated with HSS/AAA server 235, profile information associated with user device 260 that identifies applications and/or services that are permitted for and/or accessible by user device 260, information associated with a user of user device 260 (e.g., a username, a password, a personal identification number ("PIN"), etc.), rate information, minutes allowed, bandwidth allocation policy information, and/or other information. Additionally, or alternatively, HSS/AAA server 235 may include a device that performs authentication, authorization, and/or accounting operations associated with a communication session associated with user device 260.

CSCF server 240 may include one or more server devices, or other types of computation and/or communication devices, that gather, process, search, store, and/or provide information in a manner described herein. CSCF server 240 may process and/or route calls to and from user device 260 via the EPC. For example, CSCF server 240 may process calls received from network 210 that are destined for user device 260. In another example, CSCF server 240 may process calls received from user device 260 that are destined for network 210.

Base station 250 may include one or more devices that receive, process, and/or transmit traffic, such as audio, video, text, and/or other data, destined for and/or received from user device 260. In some implementations, base station 250 may be include an eNB associated with the LTE network that receives traffic from and/or sends traffic to network 210 via PGW 225 and/or SGW 230. Additionally, or alternatively, one or more base stations 250 may be associated with a RAN that is not associated with the LTE network. Base station 250 may send traffic to and/or receive traffic from user device 260 via an air interface. In some implementations, base station 250 may be a small cell, such as a microcell, a picocell, and/or a femtocell. Additionally, or alternatively, multiple spatially separated radiating elements may be connected to a common base station 250, for example, using a distributed antenna system (DAS).

User device 260 may include any computation and/or communication device, such as a wireless mobile communication device, that is capable of communicating with base station 250 and/or a network (e.g., network 210). For example, user device 260 may include a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a camera, a personal gaming system, a mobile code reader, a parking meter, an energy use monitor, a vending machine, and/or another type of mobile computation and/or communication device. Additionally, or alternatively, user device 260 may include one or more data processing and/or traffic transfer devices, such as a gateway, a router, a modem, a switch, a firewall, a NIC, a hub, a bridge, a proxy server, an OADM, a mobile hotspot device, a tethering device, or any other type of device that processes and/or transfers traffic. User device 260 may send traffic to and/or receive traffic from network 210 (e.g., via base station 250, SGW 230, and/or PGW 225).

Figure 3:
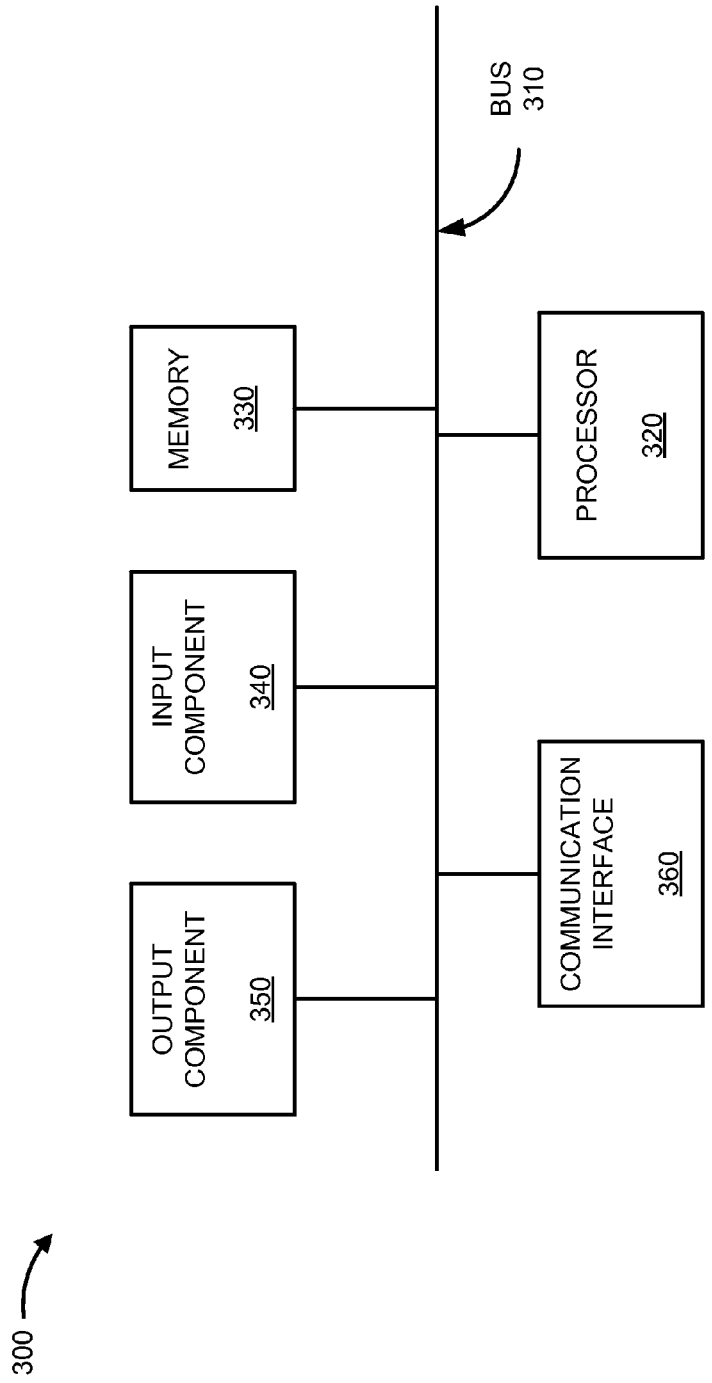
FIG. 3 is a diagram of example components of one or more devices and/or systems of FIG. 2.

FIG. 3 is a diagram of example components of a device 300. Device 300 may correspond to MME 220, PGW 225, SGW 230, HSS/AAA server 235, CSCF server 240, base station 250, and/or user device 260. Additionally, or alternatively, each of MME 220, PGW 225, SGW 230, HSS/AAA server 235, CSCF server 240, base station 250, and/or user device 260 may include one or more devices 300 and/or one or more components of device 300.

Device 300 may include a bus 310, a processor 320, a memory 330, an input component 340, an output component 350, and a communication interface 360. In some implementations, device 300 may include additional components, fewer components, different components, or differently arranged components than those illustrated in FIG. 3.

Bus 310 may include a path that permits communication among the components of device 300. Processor 320 may include a processor, a microprocessor, and/or any processing logic (e.g., a field-programmable gate array ("FPGA"), an application-specific integrated circuit ("ASIC"), etc.) that interprets and executes instructions. Memory 330 may include a random access memory ("RAM"), a read only memory ("ROM"), and/or any type of dynamic or static storage device (e.g., a flash, magnetic, or optical memory) that stores information and/or instructions for use by processor 320.

Input component 340 may include any mechanism that permits a user to input information to device 300 (e.g., a keyboard, a keypad, a mouse, a button, a switch, etc.). Output component 350 may include any mechanism that outputs information (e.g., a display, a speaker, one or more light-emitting diodes ("LEDs"), etc.). Communication interface 360 may include any transceiver-like mechanism, such as a transceiver and/or a separate receiver and transmitter, that enables device 300 to communicate with other devices and/or systems, such as via a wired connection, a wireless connection, or a combination of wired and wireless connections. For example, communication interface 360 may include mechanisms for communicating with another device and/or system via a network, such as network 260. Additionally, or alternatively, communication interface 360 may be a logical component that includes input and output ports, input and output systems, and/or other input and output components that facilitate the transmission of data to and/or from other devices, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions contained in a computer-readable medium, such as memory 330. A computer-readable medium may be defined as a non-transitory memory device. A memory device may include space within a single storage device or space spread across multiple storage devices.

Software instructions may be read into memory 330 from another computer-readable medium or from another device via communication interface 360. Software instructions stored in memory 330 may cause processor 320 to perform processes that are described herein. Additionally, or alternatively, hardwired circuitry may be used in place of or in combination with software instructions to implement processes described herein. Thus, implementations described herein are not limited to any specific combination of hardware circuitry and software.

Figure 4:
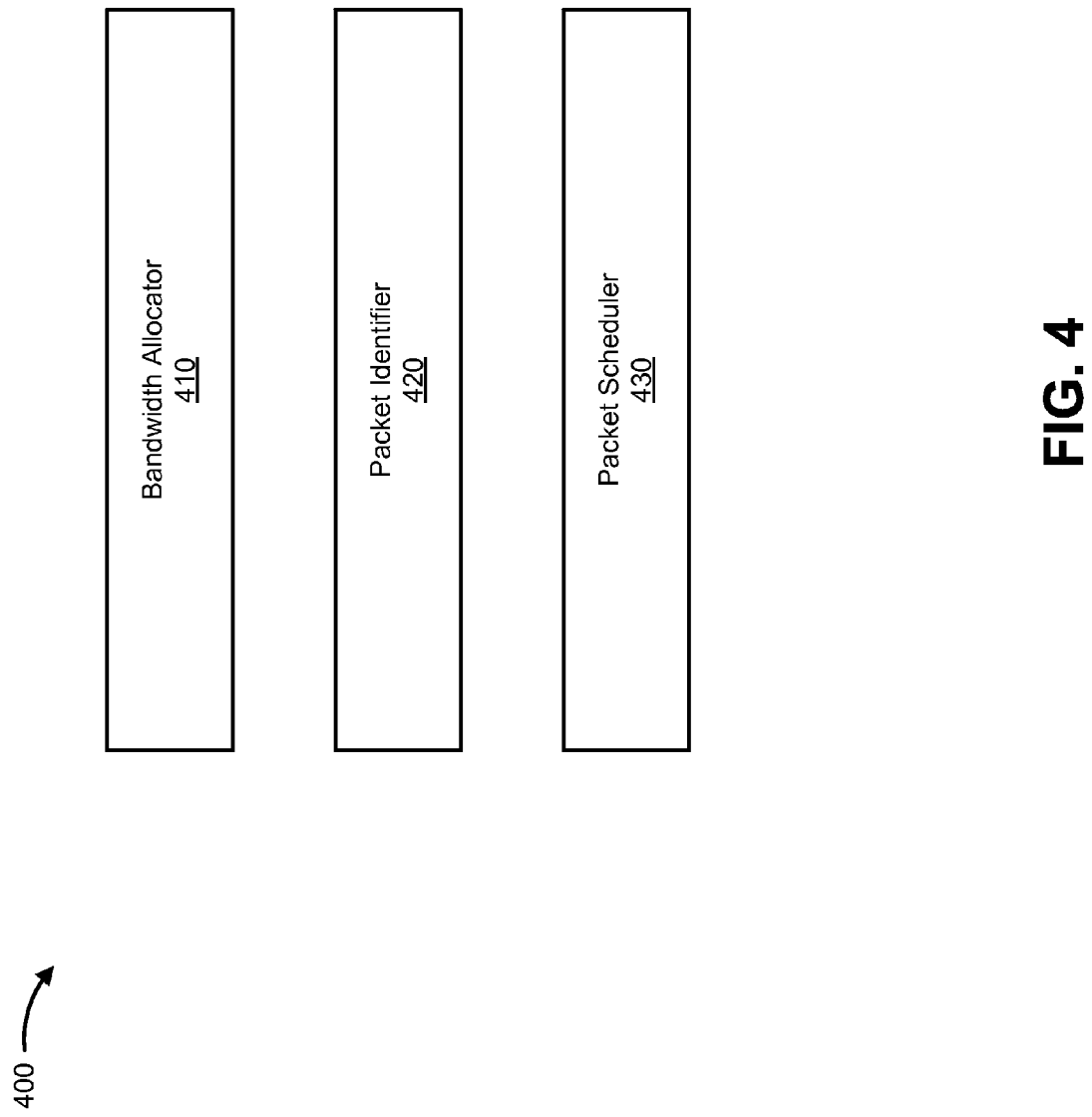
FIG. 4 is a diagram of example functional components of one or more devices and/or systems of FIG. 2.

FIG. 4 is a diagram of example functional components of a device 400 that may correspond to PGW 225, SGW 230, and/or base station 250. As illustrated, device 400 may include a bandwidth allocator 410, a packet identifier 420, and a packet scheduler 430. Each of functional components 410-430 may be implemented using one or more components of device 300. PGW 225, SGW 230, and/or base station 250 may individually include all of the functional components depicted in FIG. 4, or the functional components depicted in FIG. 4 may be distributed singularly or duplicatively in any manner between the devices illustrated in FIG. 2. In some implementations, PGW 225, SGW 230, and/or base station 250 may include other functional components (not shown) that aid in prioritizing, queuing, scheduling, and/or servicing packets associated with communications to and from user devices 260.

Bandwidth allocator 410 may perform operations associated with allocating bandwidth. In some implementations, bandwidth allocator 410 may generate and/or receive a bandwidth allocation policy that specifies a portion of bandwidth and/or a fraction of available bandwidth to be allocated to a user device 260, a traffic class associated with packets that may be transmitted to and/or from user device 260, and/or an application that may be run on user device 260. Additionally, or alternatively, the bandwidth allocation policy may identify a particular algorithm (e.g., fair queuing, weighted fair queuing, etc.) to be used to allocate bandwidth to user devices 260, traffic classes, and/or applications. Bandwidth allocator 410 may allocate bandwidth to user devices 260, traffic classes, and/or applications based on the bandwidth allocation policy. Additionally, or alternatively, bandwidth allocator 410 may provide the bandwidth allocation policy to packet scheduler 430 so that packet scheduler 430 may queue and/or service packets based on the bandwidth allocation policy.

The bandwidth allocation policy may specify a bandwidth allocation for user devices 260. For example, bandwidth available at a particular base station 250 may be allocated to user devices 260 associated with the particular base station 250. In some implementations, bandwidth may be allocated equally among two or more user devices 260. Additionally, or alternatively, bandwidth may be allocated differently (e.g., different amounts) among different user devices 260.

The bandwidth allocation policy may specify an amount of bandwidth and/or a fraction of available bandwidth to allocate to user devices 260 based on a scheduling algorithm, such as fair queuing, weighted fair queuing, first-in first-out, round-robin, weighted round-robin, etc. (e.g., any work scheduling algorithm). For example, the bandwidth allocation policy may specify that bandwidth be allocated to user device 260 using a weighted fair queuing algorithm. The weighted fair queuing algorithm may allocate bandwidth to a user device 260 based on a weight associated with the user device 260. If the weights associated with user devices 260 are equal, then each user device 260 may be allocated the same amount of bandwidth. If the weights associated with user devices 260 are not equal, then each user device 260 may be allocated different amounts of bandwidth.

Each user device 260 may be associated with a queue. The bandwidth allocation policy may ensure that an overloaded queue for one user device 260 does not consume bandwidth reserved for other user devices 260. In some implementations, bandwidth allocator 410 may allocate a minimum bandwidth, a maximum bandwidth, and/or an average bandwidth to a user device 260. The bandwidth allocation policy may specify an order and/or sequence for servicing user device queues, and may specify a quantity of packets to be serviced from a user device queue each time that user device queue is serviced.

The bandwidth allocation policy may specify that bandwidth reserved for empty queues be made available to service packets in non-empty queues and/or backed-up queues (e.g., queues that have more packets waiting to be delivered when compared to other queues, queues that have greater than a particular quantity of packets, etc.). For example, a first user device 260 may be associated with a non-empty queue, and a second user device 260 may be associated with an empty queue. Some or all of the bandwidth originally allocated to the second user device 260 may be allocated to service packets waiting in the non-empty queue associated with the first user device 260. However, if the second user device 260 establishes a non-empty queue (e.g., requests data, transmits data, and/or otherwise becomes associated with a packet), bandwidth may be re-allocated to the second user device 260 (e.g., from the first user device 260).

The bandwidth allocation policy may specify an amount of bandwidth and/or a fraction of available bandwidth to allocate to user devices 260 based on characteristics of the user devices 260. User device characteristics may include an identifier associated with a user device 260 (e.g., a phone number, a network address, etc.), a type of user device 260 (e.g., a mobile hotspot may be allocated more or less bandwidth than a mobile phone; a smart phone may be allocated more or less bandwidth than a non-smart phone), a capability of a user device 260 (e.g., user devices 260 capable of receiving data at a higher bit rate compared to other user devices 260 may be allocated more or less bandwidth than the other user devices 260), a subscription type associated with a user device 260 (e.g., user devices 260 associated with a premium subscription may be allocated more bandwidth than user devices 260 associated with a basic subscription), a bandwidth utilization associated with a user device 260 (e.g., a first user device 260 that uses more bandwidth, on average, than a second user device 260 may be allocated more or less bandwidth than the second user device 260), and/or any other characteristics that may be used to differentiate user devices 260.

In some implementations, user device characteristics may include a QoS associated with user device 260. For example, bandwidth may be allocated to ensure that QoS requirements are met. QoS requirements may include a service response time, a transmission delay, a signal-to-noise ratio, a packet error loss rate, a required bit rate, a bit error rate, etc.

The bandwidth allocation policy may specify an amount of bandwidth to be allocated to user devices 260 based on network conditions. Network conditions may include a quantity of user devices 260 associated with a base station 250. For example, a first base station 250, associated with a first quantity of first user devices 260, may allocate more or less bandwidth to the first user devices 260 than a second base station 250, associated with a second quantity of second user devices 260, allocates to the second user devices 260. In some implementations, when a user device 260 departs a service area associated with a base station 250, the bandwidth allocated to departing user device 260 may be allocated to other user devices 260 associated with the base station 250. Similarly, when a user device 260 enters a service area associated with a base station 250, bandwidth previously allocated to other user devices 260 may be allocated to the entering user device 260. In some implementations, network conditions may include an average quantity of user devices 260 associated with a base station 250 during a particular time period.

Additionally, or alternatively, network conditions may include a bandwidth utilization associated with a base station 250. For example, bandwidth may be allocated based on an average bandwidth utilization of one or more user devices 260 (e.g., over a particular time period). Additionally, or alternatively, network conditions may include a connection quality between a user device 260 and a base station 250. For example, the bandwidth allocation policy may specify that more or less bandwidth be allocated to a user device 260 associated with a higher signal strength than a second user device 260.

The bandwidth allocation policy may specify a bandwidth allocation for traffic classes. For example, bandwidth allocated to a user device 260 and/or an application may be sub-allocated to traffic classes associated with the user device 260 and/or the application. Additionally, or alternatively, bandwidth may first be allocated to a traffic class, and may then be sub-allocated to user devices 260 and/or applications associated with the traffic class.

In some implementations, bandwidth may be allocated equally among two or more traffic classes. Additionally, or alternatively, bandwidth may be allocated differently (e.g., different amounts) to different traffic classes.

The bandwidth allocation policy may allocate bandwidth to traffic classes based on characteristics and/or priorities associated with the traffic class. In some implementations a traffic class may include a QCI class. A QCI class may be identified by a QCI value of 1 through 9, with QCI values 1 through 4 identifying guaranteed bit rate services, and QCI values 5 through 9 identifying non-guaranteed bit rate services. QCI 1 may identify packets associated with conversational voice communications. QCI 2 may identify packets associated with conversational video communications. QCI 3 may identify packets associated with real-time gaming communications. QCI 4 may identify packets associated with streaming video communications. QCI 5 may identify packets associated with IMS signaling communications. QCIs 6, 8, and 9 may identify packets associated with streaming video, web, and/or e-mail communications. QCI 7 may identify packets associated with voice, video, and/or gaming communications.

QCI classes may have a priority order of QCI 5, QCI 1, QCI 3, QCI 2, QCI 4, QCI 6, QCI 7, QCI 8, and QCI 9, with QCI 5 having the highest priority and QCI 9 having the lowest priority. In some implementations, the bandwidth allocation policy may have fewer, additional, different, or differently defined traffic classes. Additionally, or alternatively, the bandwidth allocation policy may allocate bandwidth to traffic classes based on other characteristics and/or priorities associated with QCI classes and/or traffic classes.

The bandwidth allocation policy may specify an amount of bandwidth and/or a fraction of available bandwidth (e.g., bandwidth allocated to a particular user device 260 and/or application) to allocate to traffic classes based on a scheduling algorithm, such as fair queuing, weighted fair queuing, first-in first-out, round-robin, weighted round-robin, etc. (e.g., any work scheduling algorithm). For example, the bandwidth allocation policy may specify that bandwidth be allocated to a traffic class using a weighted fair queuing algorithm that allocates bandwidth to each traffic class based on a weight and/or priority associated with the traffic class. If the weights associated with different traffic classes are equal, then the traffic classes may be allocated the same amount of bandwidth. If the weights associated with different traffic classes are not equal, then the traffic classes may be allocated different amounts of bandwidth.

Each traffic class may be associated with a queue. The bandwidth allocation policy may ensure that an overloaded queue for one traffic class does not consume bandwidth reserved for other traffic classes. In some implementations, bandwidth allocator 410 may allocate a minimum bandwidth, a maximum bandwidth, and/or an average bandwidth to a traffic class. The bandwidth allocation policy may specify an order and/or sequence for servicing traffic class queues, and may specify a quantity of packets to be serviced from a traffic class queue each time that traffic class queue is serviced.

The bandwidth allocation policy may indicate that bandwidth reserved for empty queues be made available to service packets in non-empty queues and/or backed-up queues (e.g., queues that have more packets waiting to be delivered when compared to other queues, queues that have greater than a particular quantity of packets, etc.). For example, a first traffic class may be associated with a non-empty queue, and a second traffic class may be associated with an empty queue. Some or all of the bandwidth originally allocated to the second traffic class may be allocated to service packets waiting in the non-empty queue associated with the first traffic class. However, if the second traffic class establishes a non-empty queue (e.g., becomes associated with a packet), bandwidth may be re-allocated to the second traffic class (e.g., from the first traffic class).

The bandwidth allocation policy may specify a bandwidth allocation for one or more applications (e.g., applications associated with a user device 260 and/or a traffic class). For example, bandwidth allocated to a user device 260 and/or a traffic class may be sub-allocated to applications associated with the user device 260 and/or the traffic class. Additionally, or alternatively, bandwidth may first be allocated to an application (e.g., an application associated with multiple user devices 260 and/or multiple traffic classes), and may then be sub-allocated to user devices 260 and/or traffic classes associated with the application.

In some implementations, bandwidth may be allocated equally among two or more applications. Additionally, or alternatively, bandwidth may be allocated differently (e.g., different amounts) to different applications.

The bandwidth allocation policy may specify an amount of bandwidth and/or a fraction of available bandwidth (e.g., bandwidth allocated to a particular user device 260 and/or traffic class) to be allocated to applications based on a scheduling algorithm, such as fair queuing, weighted fair queuing, first-in first-out, round-robin, weighted round-robin, etc. (e.g., any work scheduling algorithm). For example, the bandwidth allocation policy may specify that bandwidth be allocated to an application using a weighted fair queuing algorithm. The weighted fair queuing algorithm may allocate bandwidth to an application based on a weight associated with the application. If the weights associated with different applications are equal, then the applications may be allocated the same amount of bandwidth. If the weights associated with different applications are not equal, then the applications may be allocated different amounts of bandwidth.

Each application may then be associated with a queue. The bandwidth allocation policy may ensure that an overloaded queue for one application does not consume bandwidth reserved for other applications. In some implementations, bandwidth allocator 410 may allocate a minimum bandwidth, a maximum bandwidth, and/or an average bandwidth an application. The bandwidth allocation policy may specify an order and/or sequence for servicing application queues, and may specify a quantity of packets to be serviced from an application queue each time the application queue is serviced.

The bandwidth allocation policy may specify that bandwidth reserved for empty queues be made available to service packets in non-empty queues and/or backed-up queues (e.g., queues that have more packets waiting to be delivered when compared to other queues, queues that have greater than a particular quantity of packets, etc.). For example, a first application may be associated with a non-empty queue, and a second application may be associated with an empty queue. Some or all of the bandwidth allocated to the second application may be allocated to service packets waiting in the non-empty queue associated with the first application. However, if the second application establishes a non-empty queue (e.g., requests data, transmits data, and/or otherwise becomes associated with a packet), bandwidth may be re-allocated to the second application (e.g., from the first application).

The bandwidth allocation policy may specify an amount of bandwidth and/or a fraction of available bandwidth to allocate to an application based on characteristics of the application. Application characteristics may include an identifier associated with an application (e.g., a user may identify applications to be prioritized on user device 260), a type of application (e.g., a web application, a voice application, a video application, a gaming application, etc.), a subscription type associated with an application (e.g., application developers may pay for a subscription to have their applications prioritized), a bandwidth utilization associated with an application (e.g., a first application that uses more bandwidth, on average, than a second application may be allocated more or less bandwidth than the second application), and/or any other characteristics that may be used to differentiate applications.

In some implementations, application characteristics may include a QoS associated with an application. For example, bandwidth may be allocated to ensure that QoS requirements are met. QoS requirements may include a service response time, a transmission delay, a signal-to-noise ratio, a packet error loss rate, a required bit rate, a bit error rate, etc.

The bandwidth allocation policy may specify an amount and/or a fraction of available bandwidth to be allocated to applications based on user device conditions. User device conditions may include a quantity of applications running on a user device 260. For example, when an application is terminated on a user device 260, the bandwidth allocated to the terminated application may be allocated to other applications running on user device 260. Similarly, when an application is launched on a user device 260, bandwidth previously allocated to other applications may be allocated to the launched application.

Additionally, or alternatively, user device conditions may include a bandwidth utilization associated with an application. For example, bandwidth may be allocated based on an average bandwidth utilization of one or more applications running on a user device 260 (e.g., over a particular time period).

Packet identifier 420 may perform operations associated with identifying characteristics associated with a packet. Packet characteristics may include information identifying a device (e.g., user device 260) associated with a packet (e.g., a source of and/or a destination for a packet), information identifying a traffic class associated with a packet, and/or information identifying an application associated with a packet. In some implementations, packet identifier 420 may receive packet characteristics associated with a packet. Additionally, or alternatively, packet identifier 420 may identify packet characteristics associated with a packet, and may embed the identified packet characteristics in the packet and/or attach the identified packet characteristics to the packet. For example, packet identifier 420 may embed the identified packet characteristics in a field in a packet header, such as in a differentiated services code point ("DSCP") field, or append the identified packet characteristics to the packet.

Packet scheduler 430 may perform operations associated with queuing, scheduling, and/or servicing packets. Packet scheduler 430 may receive information that identifies packet characteristics (e.g., from packet identifier 420), and may store packets and/or information associated with packets (e.g., information that identifies a packet) in a queue based on the received information. For example, packet scheduler 430 may store packets and/or information associated with packets in a queue based on a user device 260 associated with the packet, a traffic class associated with the packet, and/or an application associated with the packet.

Packet scheduler 430 may prioritize and/or service a packet based on a queue (e.g., a user device queue, a traffic class queue, and/or an application queue) associated with the packet. For example, the bandwidth allocation policy may specify an order, sequence, and/or priority of queues. Packet scheduler 430 may service queues based on the order, sequence, and/or priority specified by the bandwidth allocation policy and/or a work scheduling algorithm. In some implementations, packet scheduler 430 may store a serviced packet and/or information associated with a serviced packet in another queue based on characteristics associated with the packet. Additionally, or alternatively, packet scheduler 430 may store a serviced packet and/or information associated with a serviced packet into an output queue for delivery to a device (e.g., user device 260).

In some implementations, packet scheduler 430 may represent multiple packet schedulers. The multiple packet schedulers may be assigned to different sets of queues and/or stages of queues (e.g., stages of queues in a queue hierarchy).

Figure 5:
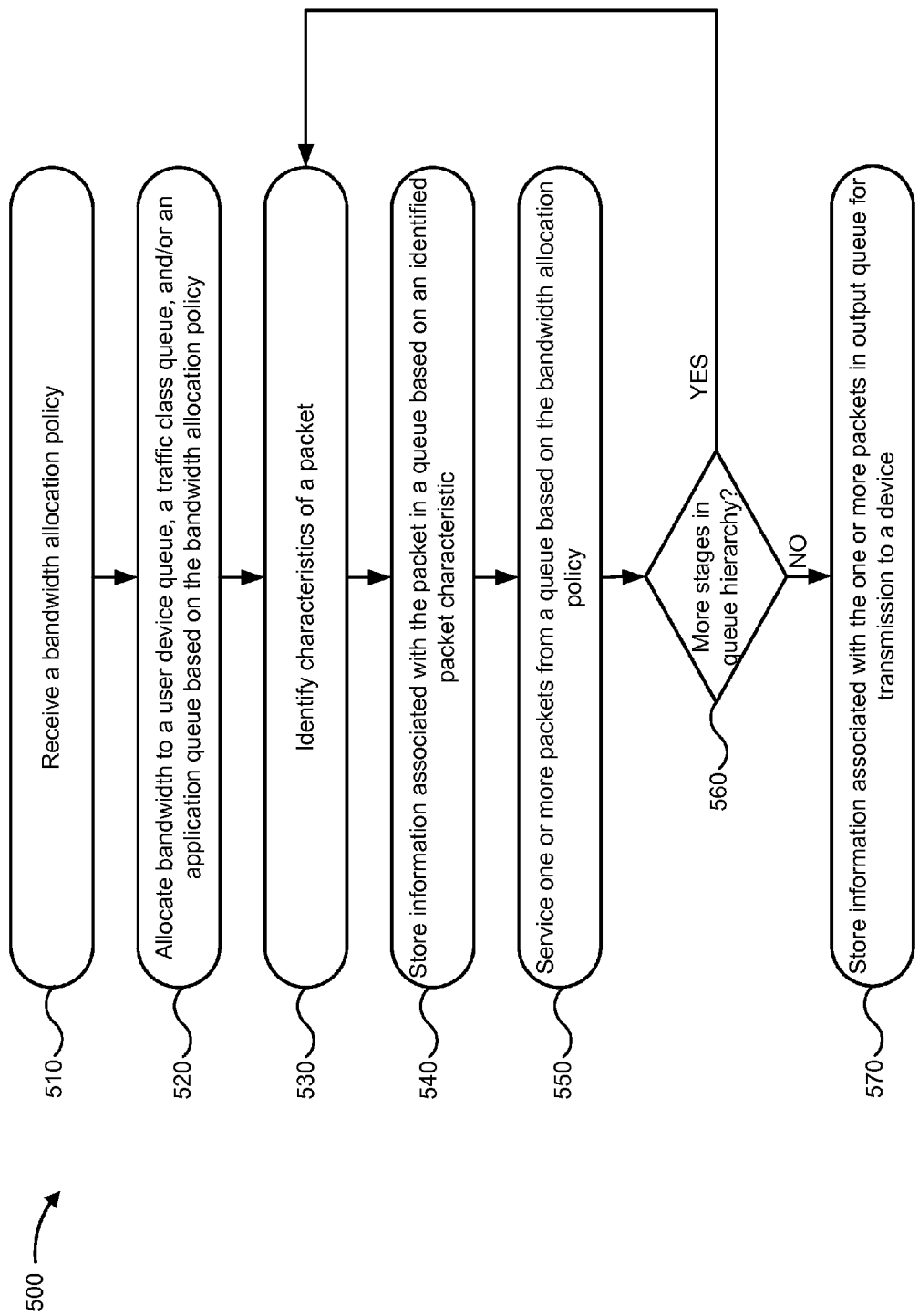
FIG. 5 is a diagram of an example process for queuing and servicing packets based on a bandwidth allocation policy.

FIG. 5 is a diagram of an example process 500 for queuing and servicing packets based on a bandwidth allocation policy. In some implementations, one or more process blocks of FIG. 5 may be performed by one or more components of PGW 225, SGW 230, and/or base station 250.

Process 500 may include receiving a bandwidth allocation policy (block 510). In some implementations, bandwidth allocator 410 may receive a bandwidth allocation policy from PGW 225, SGW 230, HSS/AAA server 235, base station 250, and/or an operator.

Process 500 may include allocating bandwidth to a user device queue, a traffic class queue, and/or an application queue based on the bandwidth allocation policy (block 520). Bandwidth allocator 410 may allocate bandwidth to one, two, or all three of user device queues, traffic class queues, or application queues. Additionally, or alternatively, bandwidth may be allocated to user device queues, traffic class queues, and/or application queues in any order. Bandwidth allocator 410 may sub-allocate bandwidth to user device queues, traffic class queues, and/or application queues based on the allocation order.

In some implementations, bandwidth allocator 410 may first allocate bandwidth to user device queues, may then sub-allocate the bandwidth allocated to a particular user device queue to traffic class queues associated with the particular user device queue, and may then sub-allocate the bandwidth allocated to a particular traffic class queue to application queues associated with the particular traffic class queue. Alternatively, bandwidth allocator 410 may first allocate bandwidth to user device queues, may then sub-allocate user device bandwidth to application queues, and may then sub-allocate application bandwidth to traffic class queues.

In some implementations, bandwidth allocator 410 may first allocate bandwidth to traffic class queues, may then sub-allocate the bandwidth allocated to a particular traffic class queue to user device queues associated with the particular traffic class queue, and may then sub-allocate the bandwidth allocated to a particular user device queue to application queues associated with the particular user device queue. Alternatively, bandwidth allocator 410 may first allocate bandwidth to traffic class queues, may then sub-allocate traffic class bandwidth to application queues, and may then sub-allocate application bandwidth to user device queues.

In some implementations, bandwidth allocator 410 may first allocate bandwidth to application queues, may then sub-allocate the bandwidth allocated to a particular application queue to user device queues associated with the particular application queue, and may then sub-allocate the bandwidth allocated to a particular user device queue to traffic class queues associated with the particular user device queue. Alternatively, bandwidth allocator 410 may first allocate bandwidth to application queues, may then sub-allocate application bandwidth to traffic class queues, and may then sub-allocate traffic class bandwidth to user device queues.

Process 500 may include identifying characteristics of a packet (block 530). In some implementations, packet identifier 420 may store characteristics of a packet in the packet header. Additionally, or alternatively, packet identifier 420 may identify characteristics of a packet based on information carried in fields of a packet header. Additionally, or alternatively, packet identifier 420 may provide the packet characteristics to packet scheduler 430. Packet characteristics may include information relating to a user device associated with a packet, a traffic class associated with a packet, and/or an application associated with a packet.

Process 500 may include storing information associated with the packet in a queue based on an identified packet characteristic (block 540). In some implementations, packet scheduler 430 may store a packet and/or information associated with a packet in a queue based on a user device 260 associated with the packet, a traffic class associated with the packet, and/or an application associated with the packet. Packets and/or information associated with packets may be successively stored in queues that are included in a hierarchy of queues. The order and/or sequence of the queue hierarchy may be specified by the bandwidth allocation policy.

Process 500 may include servicing one or more packets from a queue based on the bandwidth allocation policy (block 550). In some implementations, packet scheduler 430 may service a quantity of packets from a queue (e.g., a queue associated with a user device 260, a traffic class, and/or an application). The queue to be serviced and/or the quantity of packets to service from a queue may be specified by the bandwidth allocation policy. As used herein, "servicing" a packet may refer to reading the packet and/or information associated with the packet from a queue, identifying a packet characteristic associated with the packet (e.g., using packet identifier 420), and placing the packet and/or information associated with the packet in another queue based on the identified packet characteristic. Additionally, or alternatively, "servicing" a packet may refer to delivering the packet and/or information associated with the packet to a device (e.g., user device 260 or SGW 230).

Process 500 may include determining whether there are more stages in the queue hierarchy (block 560). In some implementations, packet scheduler 430 may determine whether there are more stages in a queue hierarchy based on the bandwidth allocation policy. The bandwidth allocation policy may specify a quantity of stages in the queue hierarchy, a packet characteristic associated with each stage, an order and/or sequence of stages, and/or a work scheduling algorithm associated with each stage.

If there are more stages in the queue hierarchy (block 560—YES), process 500 may include returning to process block 530 to identify an additional characteristic of a packet (block 530), queue the packet based on the identified additional packet characteristics (block 540), and service one or more packets from a queue based on the bandwidth allocation policy (block 550).

If there are not more stages in the queue hierarchy (block 560—NO), process 500 may include storing information associated with the one or more packets in an output queue for transmission to a device (block 570). In some implementations, packet scheduler 430 may store the serviced packets and/or information associated with the serviced packets in an output queue to be delivered to a device (e.g., SGW 230 or user device 260) based on a work scheduling algorithm (e.g., first-in, first-out).

Figure 6:
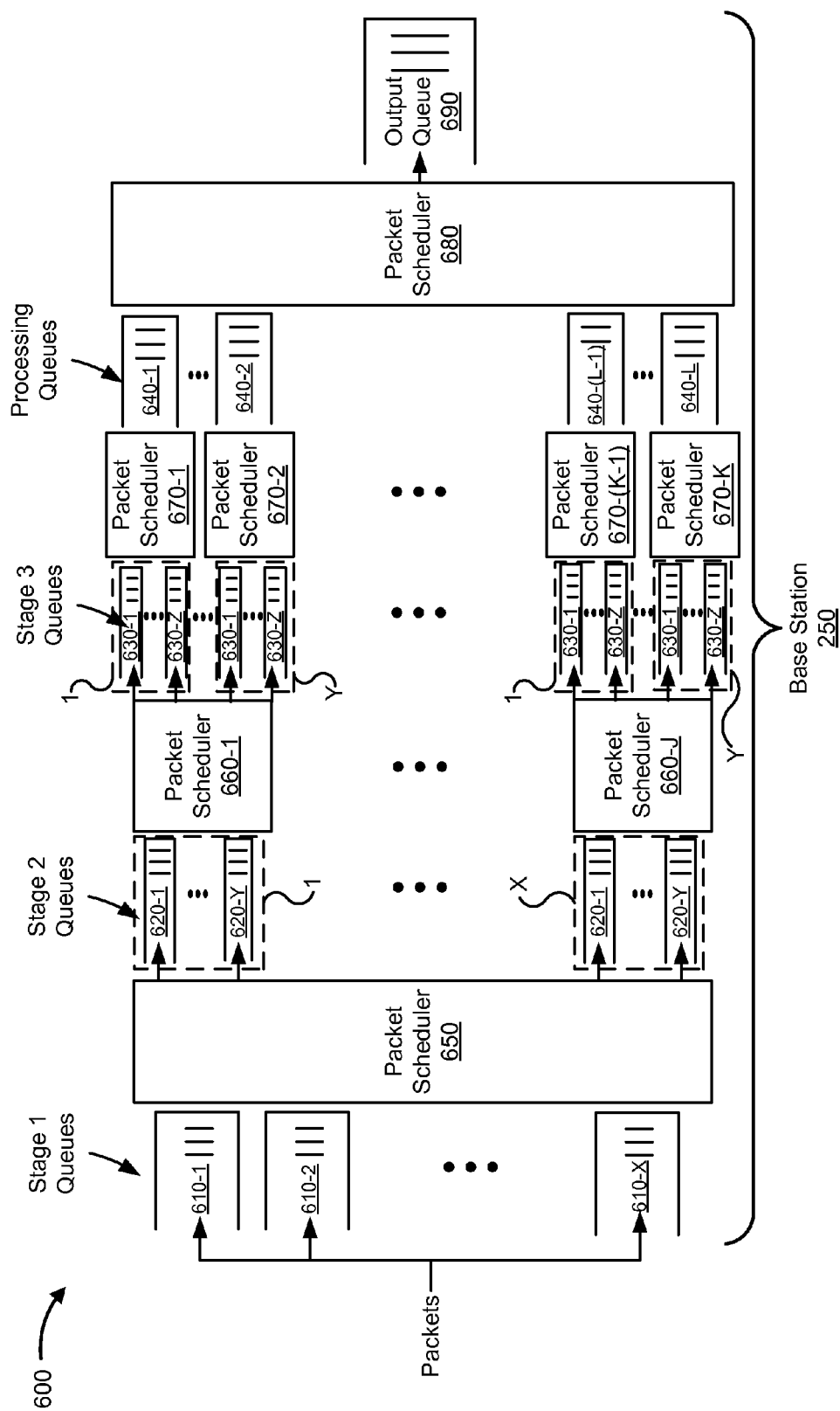
FIG. 6 is a diagram of an example bandwidth allocation according to implementations described herein.

FIG. 6 is a diagram of an example bandwidth allocation 600 according to implementations described herein. Assume that example bandwidth allocation 600 occurs in base station 250. However, in some implementations, example bandwidth allocation 600 may occur in PGW 225 or SGW 230.

Example bandwidth allocation 600 includes three stages of queues. The first stage of queues may include X stage 1 queues 610-1 through 610-X (X≥1) (hereinafter referred to collectively as "stage 1 queues 610," and individually as "stage 1 queue 610").

The second stage of queues may include a set of stage 2 queues 620-1 through 620-Y (Y≥1) associated with each stage 1 queue 610 (hereinafter referred to collectively as "stage 2 queues 620," and individually as "stage 2 queue 620"). In some implementations, the value of Y may be the same for two or more sets of stage 2 queues 620. If the value of Y is the same for each stage 2 queue 620, then the total quantity of stage 2 queues 620 will be equal to X×Y (X times Y). Additionally, or alternatively, the value of Y may be different for two or more sets of stage 2 queues 620.

The third stage of queues may include a set of stage 3 queues 630-1 through 630-Z (Z≥1) associated with each stage 2 queue 620 (hereinafter referred to collectively as "stage 3 queues 630," and individually as "stage 3 queue 630"). In some implementations, the value of Z may be the same for two or more stage 3 queues 630. If the value of Y is the same for each stage 2 queue 620, and the value of Z is the same for each stage 3 queue 630, then the total quantity of stage 3 queues 630 will be equal to X×Y×Z (X times Y times Z). Additionally, or alternatively, the value of Z may be different for two or more sets of stage 3 queues 630.

Example bandwidth allocation 600 may also include processing queues 640-1 through 640-L (hereinafter referred to collectively as "processing queues 640," and individually as processing queue 640"). If the value of Y is the same for each stage 2 queue 620, then the total quantity of processing queues will be equal to X×Y (X times Y). Otherwise, the total quantity of processing queues may be equal to the total quantity of stage 2 queues 620. Example bandwidth allocation 600 may also include packet schedulers 650-680, which may correspond to packet scheduler 430.

Queues in stages 1, 2, and 3 may correspond to user device queues, traffic class queues, and/or application queues, in any order or arrangement. In some implementations, additional stages may be used, or fewer stages may be used. For example, rather than three stages, two stages may be used, or one stage could be used.

A packet may be transmitted from SGW 230 to base station 250. Packet identifier 420 may identify characteristics of the packet (e.g., a user device, a traffic class, and/or an application associated with the packet). Packet scheduler 430 may store the packet and/or information associated with the packet in a stage 1 queue 610 based on the packet characteristics associated with the packet. Packet scheduler 650 may determine an order for servicing each stage 1 queue 610 and/or a quantity of packets to service from each stage 1 queue 610. Packet scheduler 650 may make the determination based on an allocation policy (e.g., an allocation policy received from bandwidth allocator 410), and may use a work scheduling algorithm to make the determination.

For example, assume that there are two stage 1 queues, queue 610-1 and queue 610-2. An allocation policy may specify that queue 610-1 is allocated twice the amount of bandwidth as queue 610-2. Packet scheduler 650 may service queues 610-1 and 610-2 based on the allocation policy. For example, packet scheduler 650 may service two packets from queue 610-1 for every one packet serviced from queue 610-2. Packet scheduler 650 may then return to queue 610-1 to service two packets, and this process may continue in an iterative manner until no non-empty queues exist.

Packet scheduler 650 may service a packet from stage 1 queue 610, and may store information associated with the packet in a stage 2 queue 620 based on a characteristic of the packet (e.g., a user device, a traffic class, and/or an application associated with the packet). Each stage 1 queue 610 may be associated with multiple stage 2 queues 620. For example, Y stage 2 queues 620 may be associated with each stage 1 queue 610. In some implementations, the quantity of stage 2 queues 620 associated with two or more stage 1 queues 610 may be the same. Additionally, or alternatively, the quantity of stage 2 queues 620 associated with two or more stage 1 queues 610 may be different.

Packet schedulers 660-1 through 660-J (J≥1) (hereinafter referred to collectively as "packet schedulers 660," and individually as "packet scheduler 660") may service stage 2 queues 620. Packet schedulers 660 may determine an order for servicing each stage 2 queue 620 and/or a quantity of packets to service from each stage 2 queue 620. Packet schedulers 660 may make the determination based on an allocation policy (e.g., an allocation policy received from bandwidth allocator 410), and may use a work scheduling algorithm to make the determination. In some implementations, different packet schedulers 660 may use different algorithms and/or allocation policies to service different stage 2 queues 620. Additionally, or alternatively, different packet schedulers 660 may use the same algorithm and/or allocation policy to service different stage 2 queues 620. Additionally, or alternatively, packet schedulers 660 may use the same or different algorithms and/or allocation policies as packet scheduler 650 when servicing stage 2 queues 620.

For example, assume that there are three stage 2 queues, queue 620-1, queue 620-2, and queue 620-3, associated with stage 1 queue 610-1. Further, assume that queue 620-1 has nine packets queued, queue 620-2 has three packets queued, and queue 620-3 has one packet queued. An allocation policy may specify that queue 620-1 is allocated three times the amount of bandwidth as queues 620-2 and 620-3. Packet scheduler 660-1 may service queues 620-1, 620-2, and 620-3 based on the allocation policy.

For example, packet scheduler 660-1 may service three packets from queue 620-1, may then service one packet from queue 620-2, and may then service one packet from queue 620-3 (in some implementations, the allocation policy may specify a different order in which queues are to be serviced). Queue 620-3 is now empty. In the next iteration, packet scheduler 660-1 may again service three packets from queue 620-1, and may then service one packet from queue 620-2. Packet scheduler 660-1 may determine that queue 620-3 is empty, and may return to service the last three packets from queue 620-1 and the last packet from queue 620-2.

Packet schedulers 660 may service a packet from a stage 2 queue 620, and may store information associated with the packet in a stage 3 queue 630 based on a characteristic of the packet (e.g., a user device, a traffic class, and/or an application associated with the packet). Each stage 2 queue 620 may be associated with multiple stage 3 queues 630. For example, Z stage 3 queues 630 may be associated with each stage 2 queue 620. In some implementations, the quantity of stage 3 queues 630 associated with two or more stage 2 queues 620 may be the same. Additionally, or alternatively, the quantity of stage 3 queues 630 associated with two or more stage 2 queues 620 may be different.

Packet schedulers 670-1 through 670-K (K≥1) (hereinafter referred to collectively as "packet schedulers 670," and individually as "packet scheduler 670") may service stage 3 queues 630. Packet schedulers 670 may determine an order for servicing each stage 3 queue 630 and/or a quantity of packets to service from each stage 3 queue 630. Packet schedulers 670 may make the determination based on an allocation policy (e.g., an allocation policy received from bandwidth allocator 410), and may use a work scheduling algorithm to make the determination. In some implementations, different packet schedulers 670 may use different algorithms and/or allocation policies to service different stage 3 queues 630. Additionally, or alternatively, different packet schedulers 670 may use the same algorithm and/or allocation policy to service different stage 3 queues 630. Additionally, or alternatively, packet schedulers 670 may use the same or different algorithms and/or allocation policies as packet schedulers 660 and/or packet scheduler 650 when servicing stage 3 queues 630.

For example, assume that there are two stage 3 queues, queue 630-1 and queue 630-2, associated with stage 2 queue 620-1. Further, assume that queue 630-1 has three packets queued, and queue 630-2 has two packets queued. An allocation policy may specify that queue 630-1 is allocated four times the amount of bandwidth as queue 630-2. Packet scheduler 670-1 may service queues 630-1 and 630-2 based on the allocation policy.

For example, packet scheduler 670-1 may service four packets from queue 630-1. However, queue 630-1 only has three packets in queue. Packet scheduler 670-1 may service the three packets from queue 630-1, and may then service one packet from queue 630-2. Packet scheduler 670-1 may then check to see if any additional packets have been queued in queue 630-1. If additional packets have been queued in queue 630-1, packet scheduler 670-1 may service the queued packets (e.g., up to four packets) before servicing queue 630-2. If no packets have been queued in queue 630-1, packet scheduler 670-1 may service the remaining packet in queue 630-2. Packet scheduler 670-1 may continue to service packets from stage 3 queues 630 until no non-empty stage 3 queues 630 associated with packet scheduler 670-1 (e.g., associated with stage 2 queue 620-1) exist.

Packet scheduler 670 may service a packet from a stage 3 queue 630, and may store information associated with the packet in a processing queue 640. In example bandwidth allocation 600, packets in each processing queue 640 may be associated with two identical packet characteristics (e.g., identical stage 1 characteristics, such as identical user devices associated with each packet, and identical stage 2 characteristics, such as identical traffic classes associated with each packet) and a third, non-identical characteristic (e.g., different stage 3 characteristics, such as a different application associated with each packet). In other examples (e.g., where there are only two stages), packets in each processing queue 640 may be associated with a different quantity of identical packet characteristics (e.g., one identical packet characteristics when there are two stages). In some implementations, the number of identical characteristics associated with each packet in a processing queue 640 is one less than the number of stages.

Packet scheduler 680 may service processing queues 640. Packet scheduler 680 may determine an order for servicing each processing queue 640 and/or a quantity of packets to service from each processing queue 640. Packet scheduler 680 may make the determination based on an allocation policy (e.g., an allocation policy received from bandwidth allocator 410), and may use a work scheduling algorithm to make the determination. In some implementations, packet scheduler 680 may use the same or different algorithms and/or allocation policies as packet schedulers 670, packet schedulers 660 and/or packet scheduler 650 when servicing processing queues 640.

Packet scheduler 680 may service a packet from a processing queue 640, and may store information associated with the packet in an output queue 690. In some implementations, output queue 690 may output packets and/or information associated with packets on a first-in, first-out basis. Output queue 690 may output a packet and/or information associated with a packet to a device associated with the packet (e.g., user device 260 and/or SGW 230). As illustrated, queues 610-640 may be serviced by packet schedulers 650-680 associated with base station 250. Output queue 690 may also be associated with base station 250.

Figure 7:
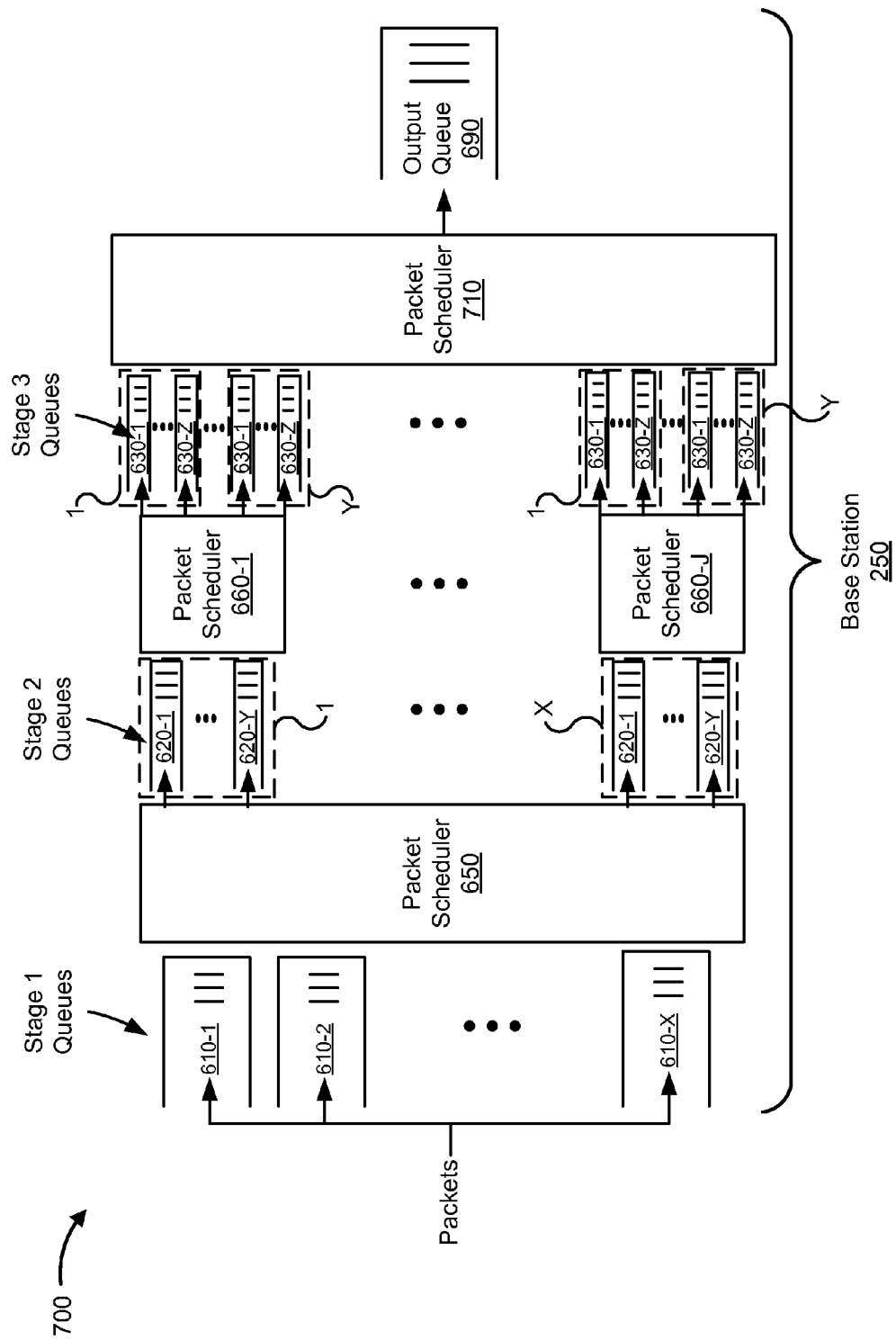
FIG. 7 is a diagram of another example bandwidth allocation according to implementations described herein.

FIG. 7 is a diagram of another example bandwidth allocation 700 according to implementations described herein. Example bandwidth allocation 700 illustrates a different implementation than example 600 for processing stage 3 queues 630. As illustrated, packet scheduler 710 may service packets from multiple stage 3 queues 630 (e.g., every stage 3 queue 630), and may store the packets and/or information associated with the packets in output queue 690. Packet scheduler 710 may correspond to packet scheduler 430.

Packet scheduler 710 may determine an order for servicing each stage 3 queue 630 and/or a quantity of packets to service from each stage 3 queue 630. Packet scheduler 710 may make the determination based on an allocation policy (e.g., an allocation policy received from bandwidth allocator 410), and may use a work scheduling algorithm to make the determination. In some implementations, packet scheduler 710 may use the same or different algorithms and/or allocation policies as packet schedulers 670, packet schedulers 660 and/or packet scheduler 650 when servicing stage 3 queues 630.

Output queue 690 may output packets and/or information associated with packets on a first-in, first-out basis. Output queue 690 may output a packet and/or information associated with a packet to a device associated with the packet (e.g., user device 260 and/or SGW 230). As illustrated, queues 610-630 may be serviced by packet schedulers 650, 660, and 710 associated with base station 250. Output queue 690 may also be associated with base station 250.

Implementations described herein are able to more fairly allocate network bandwidth associated with end user devices. This may be achieved by creating a hierarchy of packet queues associated with user devices, traffic classes, and/or applications running on user devices.

The foregoing disclosure provides illustration and description, but is not intended to be exhaustive or to limit the embodiments to the precise form disclosed. Modifications and variations are possible in light of the above disclosure or may be acquired from practice of the embodiments.

Certain implementations are described herein with reference to packets. However, implementations described herein may be applied to any communications, such as formatted data units, bytes, characters, and/or bits. Furthermore, certain implementations have been described as storing, placing, and/or queuing packets in a queue. However, implementations described herein may store, place, and/or queue a packet and/or information associated with a packet (e.g., information identifying a packet) in a queue.

While a series of blocks have been described with regard to FIG. 5, the order of the blocks may be modified in some implementations. Further, non-dependent blocks may be performed in parallel.

As used herein, the term "component" is intended to be broadly construed as hardware, firmware, or a combination of hardware and software.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A system, comprising:
one or more memories; and
one or more processors, connected to the one or more memories, to:
receive a bandwidth allocation policy;
allocate a first bandwidth to a first set of queues based on the bandwidth allocation policy,
the first set of queues including:
first traffic class queues associated with a first traffic class associated with first user devices,
first user device queues respectively associated with the first user devices and provided downstream of the first traffic class queues, and
first application queues respectively associated with first applications executable by the first user devices and provided downstream of the first user device queues,
the bandwidth allocation policy:
allocating the first bandwidth to one of the first traffic class queues,
sub-allocating a first portion that is a portion of the first bandwidth, allocated to the one of the first traffic class queues, to one of the first user device queues associated with the one of the first traffic class queues, and
sub-allocating a second portion that is a portion of the first portion of the first bandwidth to one of the first application queues associated with the one of the first user device queues;
allocate a second bandwidth to a second set of queues based on the bandwidth allocation policy,
the second set of queues including:
second traffic class queues associated with a second traffic class associated with second user devices,
second user device queues respectively associated with the second user devices and provided downstream of the second traffic class queues, and
second application queues respectively associated with second applications executable by the second user devices and provided downstream of the second user device queues, the bandwidth allocation policy:
allocating the second bandwidth to one of the second traffic class queues,
sub-allocating a third portion that is a portion of the second bandwidth, allocated to the one of the second traffic class queues, to one of the second user device queues associated with the one of the second traffic class queues, and
sub-allocating a fourth portion that is a portion of the third portion of the second bandwidth to one of the second application queues associated with the one of the second user device queues,
the first user devices being different than the second user devices, the first traffic class being different than the second traffic class, the first applications being different than the second applications, and
the first set of queues being hierarchically different than the second set of queues;
identify a first characteristic associated with one or more packets;

store information associated with the one or more packets in a first determined queue, of the first set of queues, based on the first characteristic and the bandwidth allocation policy,
the first determined queue including the one of the first traffic class queues, the one of the first user device queues, or the one of the first application queues;
identify a second characteristic different from the first characteristic and associated with the one or more packets to determine whether to transfer the information associated with the one or more packets to either a different queue in the first set of queues or a queue in the second set of queues;
transfer the information associated with the one or more packets, from the first determined queue, to a second determined queue, of either the first set of queues or the second set of queues, based on the second characteristic and the bandwidth allocation policy,
the second determined queue including a different one of the one of the first traffic class queues, the one of the first user device queues, the one of the first application queues, the one of the second traffic class queues, the one of the second user device queues, or the one of the second application queues;
determine that there are no more stages in a queue hierarchy associated with the first set of queues and the second set of queues;
transfer the information associated with the one or more packets, from the second determined queue, to an output queue based on determining that there are no more stages in the queue hierarchy; and
service the one or more packets from the output queue for delivery to a device.

2. The system of claim 1, where:
the first characteristic includes information identifying the first user devices, the first traffic class, or the first applications,
the second characteristic includes information identifying the second user devices, the second traffic class, or the second applications.

3. The system of claim 1, where the first set of queues is associated with a first plurality of user devices, a first plurality of traffic classes, or a first plurality of applications, and
the second set of queues is associated with a second plurality of user devices, a second plurality of traffic classes, or a second plurality of applications.

4. The system of claim 1, where the bandwidth allocation policy specifies a different work scheduling algorithm for transferring the information associated with the one or more packets, from the first determined queue, to the second determined queue, and for transferring the information associated with the one or more packets, from the second determined queue, to the output queue.

5. The system of claim 1, where the one or more processors are further to:
allocate a third bandwidth to a third set of queues based on the bandwidth allocation policy;
identify a third characteristic associated with the one or more packets;
transfer the information associated with the one or more packets, from the second determined queue, to a third determined queue, of the third set of queues, based on the third characteristic and the bandwidth allocation policy; and
transfer the information associated with the one or more packets, from the third determined queue, to the output queue based on determining that there are no more stages in the queue hierarchy.

6. The system of claim 5, where the third set of queues is associated with a third user device, a third traffic class, and a third application.

7. The system of claim 1, where one of the first set of queues or the second set of queues is associated with a plurality of user devices, and the bandwidth allocation policy is based on at least one of:
an identifier associated with one of the plurality of user devices;
a type associated with one of the plurality of user devices;
a capability of one of the plurality of user devices;
a bandwidth utilization associated with one of the plurality of user devices; or
a quality of service associated with one of the plurality of user devices.

8. The system of claim 7, where the plurality of user devices are associated with a base station, and where the bandwidth allocation policy is based on at least one of:
a quantity of the plurality of user devices associated with the base station;
a bandwidth utilization associated with the base station; or
a connection quality between a user device, of the plurality of user devices, and the base station.

9. A non-transitory computer-readable storage medium, comprising:
one or more instructions that, when executed by one or more processors, cause the one or more processors to:
receive a bandwidth allocation policy;
allocate a first bandwidth to a first set of queues based on the bandwidth allocation policy,
the first set of queues including:
first traffic class queues associated with a first traffic class associated with first user devices,
first user device queues respectively associated with the first user devices and provided downstream of the first traffic class queues, and
first application queues respectively associated with first applications executable by the first user devices and provided downstream of the first user device queues,
the bandwidth allocation policy:
allocating the first bandwidth to one of the first traffic class queues,
sub-allocating a first portion that is a portion of the first bandwidth, allocated to the one of the first traffic class queues, to one of the first user device queues associated with the one of the first traffic class queues, and
sub-allocating a second portion that is a portion of the first portion of the first bandwidth to one of the first application queues associated with the one of the first user device queues;
allocate a second bandwidth to a second set of queues based on the bandwidth allocation policy,
the second set of queues including:
second traffic class queues associated with a second traffic class associated with second user devices, second user device queues respectively associated with the second user devices and provided downstream of the second traffic class queues, and second application queues respectively associated with second applications executable by the second user devices and provided downstream of the second user device queues, the bandwidth allocation policy:

allocating the second bandwidth to one of the second traffic class queues, sub-allocating a third portion that is a portion of the second bandwidth, allocated to the one of the second traffic class queues, to one of the second user device queues associated with the one of the second traffic class queues, and sub-allocating a fourth portion that is a portion of the third portion of the second bandwidth to one of the second application queues associated with the one of the second user device queues, the first user devices being different than the second user devices, the first traffic class being different than the second traffic class, the first applications being different than the second applications, and the first set of queues being hierarchically different than the second set of queues;

identify a first characteristic associated with one or more packets;

store information associated with the one or more packets in a first determined queue, of the first set of queues, based on the first characteristic and the bandwidth allocation policy, the first determined queue including the one of the first traffic class queues, the one of the first user device queues, or the one of the first application queues;

identify a second characteristic different from the first characteristic and associated with the one or more packets to determine whether to transfer the information associated with the one or more packets to either a different queue in the first set of queues or a queue in the second set of queues, where the second characteristic is different from the first characteristic;

transfer the information associated with the one or more packets, from the first determined queue, to a second determined queue, of either the first set of queues or the second set of queues, based on the second characteristic and the bandwidth allocation policy, the second determined queue including different one of the one of the first traffic class queues, the one of the first user device queues, the one of the first application queues, the one of the second traffic class queues, the one of the second user device queues, or the one of the second application queues;

determine that there are no more stages in a queue hierarchy associated with the first set of queues and the second set of queues;

transfer the information associated with the one or more packets, from the second determined queue, to an output queue based on determining that there are no more stages in the queue hierarchy; and service the one or more packets from the output queue for delivery to a device.

10. The non-transitory computer-readable storage medium of claim 9, where the bandwidth allocation policy specifies a different work scheduling algorithm for transferring the information associated with the one or more packets, from the first determined queue, to the second determined queue, and for transferring the information associated with the one or more packets, from the second determined queue, to the output queue.

11. The non-transitory computer-readable storage medium of claim 9, further comprising:

one or more instructions that, when executed by the one or more processors, cause the one or more processors to:

allocate a third bandwidth to a third set of queues based on the bandwidth allocation policy, where the third set of queues does not include any queues of the first set of queues or the second set of queues;

identify a third characteristic associated with the one or more packets;

transfer the information associated with the one or more packets, from the second determined queue, to a third determined queue, of the third set of queues, based on the third characteristic and the bandwidth allocation policy; and transfer the information associated with the one or more packets, from the third determined queue, to the output queue based on determining that there are no more stages in the queue hierarchy.

12. The non-transitory computer-readable storage medium of claim 11, where the bandwidth allocation policy specifies a different work scheduling algorithm for transferring the information associated with the one or more packets, from the first determined queue, to the second determined queue, for transferring the information associated with the one or more packets, from the second determined queue, to the third determined queue, and for transferring the information associated with the one or more packets, from the third determined queue, to the output queue.

13. The non-transitory computer-readable storage medium of claim 11, where one of the first set of queues, the second set of queues, or the third set of queues is associated with a plurality of applications, and the bandwidth allocation policy is based on at least one of:

an identifier associated with one of the plurality of applications;

a type associated with one of the plurality of applications; or a bandwidth utilization associated with one of the plurality of applications.

14. The non-transitory computer-readable storage medium of claim 9, where one of the first set of queues or the second set of queues is associated with a plurality of user devices associated with a base station, and the bandwidth allocation policy is based on at least one of:

an identifier associated with one of the plurality of user devices;

a type associated with one of the plurality of user devices;

a capability of one of the plurality of user devices;

a bandwidth utilization associated with one of the plurality of user devices;

a quality of service associated with one of the plurality of user devices;

a quantity of the plurality of user devices that are associated with the base station;

a bandwidth utilization associated with the base station; or a connection quality between one of the plurality of user devices and the base station.

15. The non-transitory computer-readable storage medium of claim 9, where one of the first set of queues or the second set of queues is associated with a plurality of traffic classes, and the bandwidth allocation policy is based on at least one of:
   an identifier associated with one of the plurality of traffic classes; or
   a priority associated with one of the plurality of traffic classes.

16. A method, comprising:
   receiving, by one or more processors, a bandwidth allocation policy;
   allocating, by the one or more processors, a first bandwidth to a first set of queues based on the bandwidth allocation policy,
      the first set of queues including:
         first traffic class queues associated with a first traffic class associated with first user devices,
         first user device queues respectively associated with the first user devices and provided downstream of the first traffic class queues, and
         first application queues respectively associated with first applications executable by the first user devices and provided downstream of the first user device queues,
      the bandwidth allocation policy:
         allocating the first bandwidth to one of the first traffic class queues,
         sub-allocating a first portion that is a portion of the first bandwidth, allocated to the one of the first traffic class queues, to one of the first user device queues associated with the one of the first traffic class queues, and
         sub-allocating a second portion that is a portion of the first portion of the first bandwidth to one of the first application queues associated with the one of the first user device queues;
   allocating, by the one or more processors, a second bandwidth to a second set of queues based on the bandwidth allocation policy,
      the second set of queues including:
         second traffic class queues associated with a second traffic class associated with second user devices,
         second user device queues respectively associated with the second user devices and provided downstream of the second traffic class queues, and
         second application queues respectively associated with second applications executable by the second user devices and provided downstream of the second user device queues,
      the bandwidth allocation policy:
         allocating the second bandwidth to one of the second traffic class queues,
         sub-allocating a third portion that is a portion of the second bandwidth, allocated to the one of the second traffic class queues, to one of the second user device queues associated with the one of the second traffic class queues, and
         sub-allocating a fourth portion that is a portion of the third portion of the second bandwidth to one of the second application queues associated with the one of the second user device queues,
      the first user devices being different than the second user devices,
      the first traffic class being different than the second traffic class,
      the first applications being different than the second applications, and
      the first set of queues being hierarchically different than the second set of queues;
   identifying, by the one or more processors, a first characteristic associated with one or more packets;
   storing, by the one or more processors, information associated with the one or more packets in a first determined queue, of the first set of queues, based on the first characteristic and the bandwidth allocation policy,
      the first determined queue including the one of the first traffic class queues, the one of the first user device queues, or the one of the first application queues
   identifying, by the one or more processors, a second characteristic different from the first characteristic and associated with the one or more packets to determine whether to transfer the information associated with the one or more packets to either a different queue in the first set of queues or a queue in the second set of queues;
   transferring, by the one or more processors, the information associated with the one or more packets, from the first determined queue, to a second determined queue, of either the first set of queues or the second set of queues, based on the second characteristic and the bandwidth allocation policy,
      the second determined queue including a different one of the one of the first traffic class queues, the one of the first user device queues, the one of the first application queues, the one of the second traffic class queues, the one of the second user device queues, or the one of the second application queues;
   determining, by the one or more processors, that there are no more stages in a queue hierarchy associated with the first set of queues and the second set of queues;
   transferring, by the one or more processors, the information associated with the one or more packets, from the second determined queue, to an output queue based on determining that there are no more stages in the queue hierarchy; and
   servicing, by the one or more processors, the one or more packets from the output queue for delivery to a device.

17. The method of claim 16, where the bandwidth allocation policy specifies a different work scheduling algorithm for transferring the information associated with the one or more packets, from the first determined queue, to the second determined queue, and for transferring the information associated with the one or more packets, from the second determined queue, to the output queue.

18. The method of claim 16, where one of the first set of queues or the second set of queues is associated with a plurality of applications, and the bandwidth allocation policy is based on at least one of:
   an identifier associated with one of the plurality of applications;
   a type associated with one of the plurality of applications; or
   a bandwidth utilization associated with one of the plurality of applications.

19. The method of claim 16, where one of the first set of queues or the second set of queues is associated with a plurality of user devices associated with a base station, and the bandwidth allocation policy is based on at least one of:
   an identifier associated with one of the plurality of user devices;
   a type associated with one of the plurality of user devices;
   a capability of one of the plurality of user devices;

a bandwidth utilization associated with one of the plurality of user devices;

a quality of service associated with one of the plurality of user devices;

a quantity of the plurality of user devices associated with the base station;

a bandwidth utilization associated with the base station; or a connection quality between one of the plurality of user devices and the base station.

20. The method of claim 16, where one of the first set of queues or the second set of queues is associated with a plurality of traffic classes, and the bandwidth allocation policy is based on at least one of:

an identifier associated with one of the plurality of traffic classes; or a priority associated with one of the plurality of traffic classes.

* * * * *